United States Patent
Hecht et al.

[19]

[11] Patent Number: 5,967,300
[45] Date of Patent: Oct. 19, 1999

[54] SWITCH WITH FLEXIBLE CONDUCTOR FOIL

[75] Inventors: Walter Hecht, Bietigheim-Bissingen; Bertram Götzinger, Oedheim; Rudolf Klein, Lauffen, all of Germany

[73] Assignee: ITT Manufacturing Enterprises, Inc., Wilmington, Del.

[21] Appl. No.: 09/051,285

[22] PCT Filed: Sep. 28, 1996

[86] PCT No.: PCT/EP96/04241

§ 371 Date: Sep. 2, 1998

§ 102(e) Date: Sep. 2, 1998

[87] PCT Pub. No.: WO97/15060

PCT Pub. Date: Apr. 24, 1997

[30] Foreign Application Priority Data

Oct. 18, 1995 [DE] Germany ............... 195 38 767

[51] Int. Cl.⁶ ............................................. H01H 9/00
[52] U.S. Cl. ................ 200/512; 200/61.27; 200/292
[58] Field of Search ......................... 200/512, 514, 200/61.27, 61.54, 61.85, 292, 550, 16 D, 284

[56] References Cited

U.S. PATENT DOCUMENTS

| | | |
|---|---|---|
| 3,699,279 | 10/1972 | Lockard et al. . |
| 3,745,288 | 7/1973 | Reimer . |
| 5,512,721 | 4/1996 | Young et al. ........................... 200/512 |

FOREIGN PATENT DOCUMENTS

| | | |
|---|---|---|
| 0055053 | 6/1982 | European Pat. Off. . |
| 2262474 | 9/1975 | France . |
| 2330074 | 5/1977 | France . |
| 26 09 906 | 9/1977 | Germany . |
| 2835256 | 2/1980 | Germany . |
| 31 07 440 | 10/1982 | Germany . |
| 32 15 191 | 10/1983 | Germany . |
| 3440453 | 5/1986 | Germany . |
| 36 13 291 | 9/1987 | Germany . |
| 38 03 587 | 8/1989 | Germany . |
| 9010973 | 11/1990 | Germany . |
| 3153669 | 1/1991 | Germany . |
| 4024549 | 12/1994 | Germany . |
| 4337237 | 5/1995 | Germany . |
| 9411391 | 1/1996 | Germany . |
| 929802 | 6/1963 | United Kingdom . |
| 1319354 | 6/1973 | United Kingdom . |

OTHER PUBLICATIONS

Corporate publication: Konstruktionshinweise flexible gedruckte Schaltungen of Company Carl Freudenberg, Weinheim, pp. 1–12, (no date).

*Primary Examiner*—Renee S. Luebke
*Attorney, Agent, or Firm*—J. Gordon Lewis

[57] ABSTRACT

A switch used with steering column assemblies includes a switch mechanism provided at the end of a switch lever. To provide a low-priced and reliable connection between the switch, mechanism and connector contacts in the housing of the steering column switch, a flexible conductor foil is used. The foil is not laid within the hollow interior of the switch lever. The switch lever is rather formed of two parts between which the conductor foil is guided. In advantageous embodiments, the contacts of the conductor foil are directly used as stationary switch contacts, the switch lever is manufactured by utilizing internal gas pressure, and the switching foil contacts are reinforced with contact plates.

25 Claims, 6 Drawing Sheets

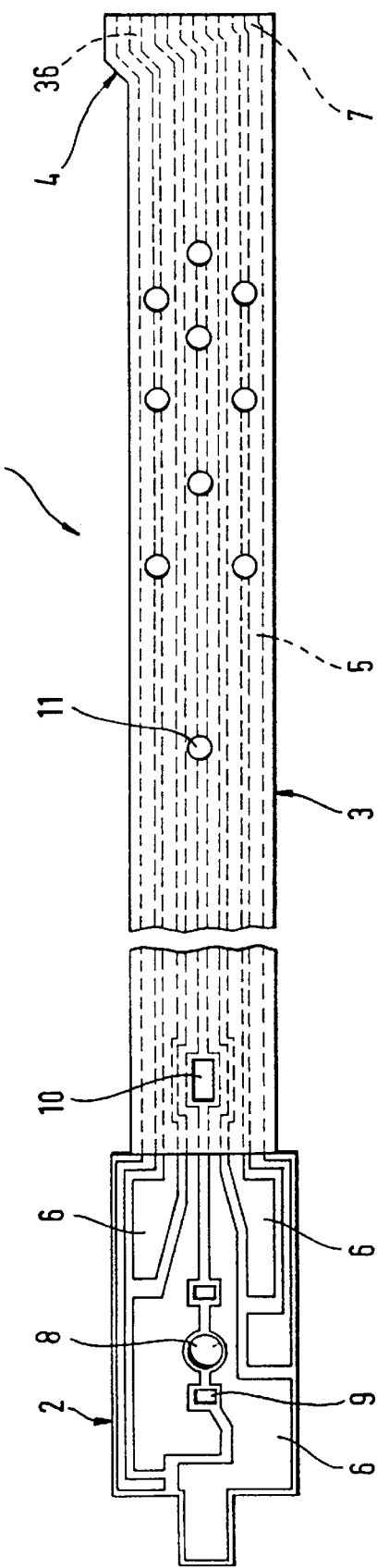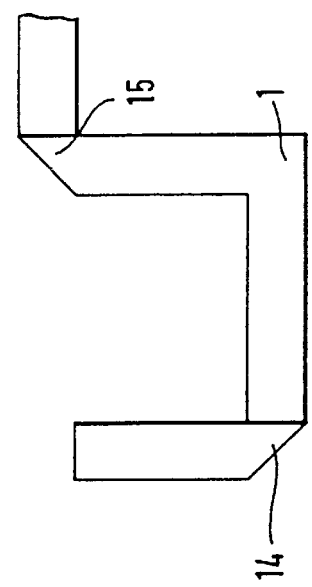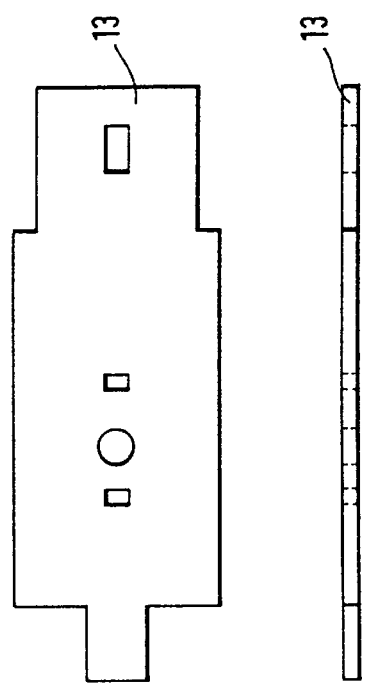

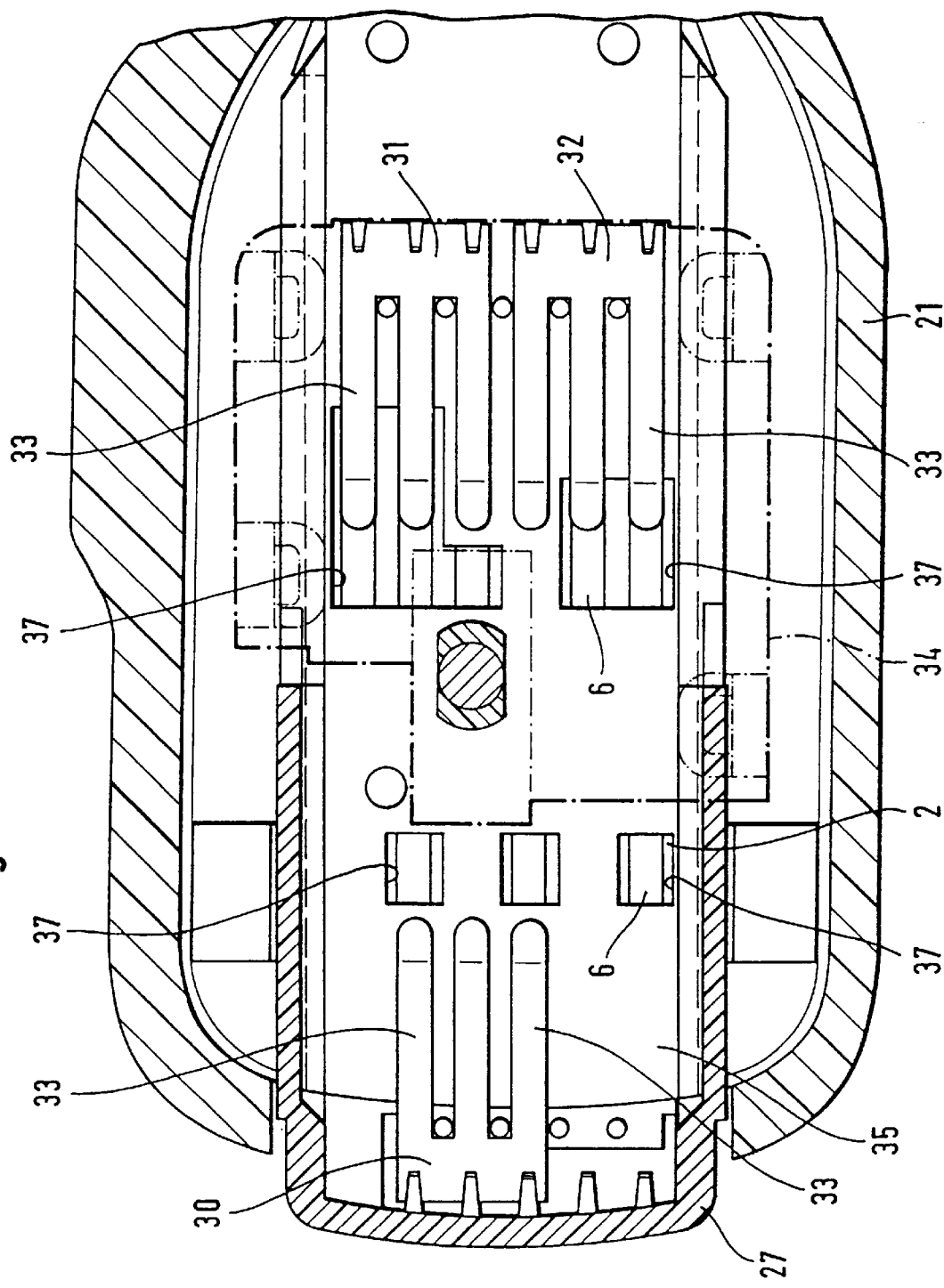

SWITCH WITH FLEXIBLE CONDUCTOR FOIL

BACKGROUND OF THE INVENTION

The present invention relates to a switch for automotive vehicles, in particular, a switch used in steering column assemblies. In switches of this type, connections are to be established between the contacts usually cast into a base plate and the connector contacts of the switch.

It is known per se to guide contact plates cast into the base plate as contact pins out of the casing so that the stationary contacts and the connectors are interconnected by integrally formed contact plates. However, measures of that type are feasible only if the number of connectors guided out of the switch is not excessively high and the connecting track between the stationary contacts and the connectors is short. Conversely, in a number of switches the stationary contacts are at a large distance from the connectors, as, for example, in switches used with steering column assemblies wherein switching contacts are housed in the rotatable or telescopic lever end of the switch lever. Contacts of the afore-described type are shown, for example, in DE-AS 2853746 according to which the stationary contacts arranged within the handle are guided via movable conduits in the interior of the switch lever to the switch casing on the steering column assembly. The connection of the switches to the contacts involves relatively high efforts.

It is the object of the invention to provide a simpler solution which, on the one hand, does not require any special technique for establishing a connection between the stationary contacts and the flexible connecting conduits and, on the other hand, eliminates the need to guide the connecting conduits through the interior of the switch lever.

SUMMARY OF THE INVENTION

The afore-mentioned problem is solved by using a single, flexible conductor mounted to a conductor foil in place of separate flexible conduits to be individually connected to the stationary contacts. The connector according to the invention can, therefore, have the outward appearance of a longitudinal flexible foil on which are conventionally mounted printed conductors extending substantially in parallel with respect to one another. Conductor foils of this type are easy to manufacture and—as explained hereinafter—present a new technique for connecting the stationary contacts to the connector contacts of the switch. Also, they permit an easy-to-manufacture and reliable switch design having extended connecting conduits.

A special advantage of the invention resides in that the flexible conductors on the connector ends facing the stationary contacts, can directly pass over into stationary contacts if the stationary contacts are formed by printed conductors of the flexible conductor foil. To that extent it will only be necessary to remove the insulator from or not provide an insulator on the side of the connection facing the movable contacts, thereby causing the conductors to directly act as contacts. Hence, the printed conductors moving across the connector integrally pass into stationary contacts with no need for the contacts to be specifically connected to the connecting lines.

However, as the flexible conductor foil does not have the strength to form an adequately stable abutment for the associated movable switch contact, it is recommended as another embodiment of the invention that the contact section of the flexible conductor foil, carrying the stationary contacts, is fixed to a board stationarily arranged on the switch to insure that the stationary printed conductor contacts have a position stable over the switch casing, thereby providing a good contact with the associated movable contacts.

For the sake of an easier assembly of the foil, for locking the foil vis-à-vis the board thereunder, and for centering the contact section on the board, at least one projection protruding from the board protrudes into a corresponding opening provided in the contact section, insuring that the foil also in its assembled condition takes the position associated to the movable contacts and is maintained in that position. The fixation of the stationary contacts vis-à-vis the board can be further improved by cementing the contact section onto the board. However, also other connecting techniques are possible, such as casting the foil into a casing plate, welding the projections to the board, or rivet-caulking the projections under the application of heat.

In practice, the use of printed conductors directly as stationary contacts has proved satisfactory. While, on the one hand, the elongated printed conductors applied to the foil can be extremely narrow, thereby enabling the conductor foil to be easily laid in that area, it should be noted, on the other hand, that due to mechanical conditions, the movable contacts and, hence, also the associated stationary contacts, are required to have a predetermined distance from one another.

To nevertheless permit employment of the invention, it is suggested that the stationary contacts are directly formed by the planar contact faces on the contact section of the conductor foil, with the planar contact faces being integrated into the flexible conductor foil and integrally connected thereto. According thereto, the relatively narrow printed conductors preferably guided in parallel with respect to one another across the conductor track pass over into planar contact areas which, in plan view, generally, have the appearance of a small printed circuit panel.

The planar, stationary contacts are especially suitable for use with switches wherein the movable contacts perform a pushing movement as there is only negligible unevenness in the pushing direction parallel to the printed circuit panel. However, to achieve an abrupt removal of the push contacts from the stationary planar contacts, it is suggested that the stationary contacts are associated to movable contacts which are displaceable in parallel to the surface of the stationary contacts, and that the contact faces of the stationary contacts are formed by recesses of an insulator foil placed on the section. While, normally, the pushing movable contact is displaced from the conducting, stationary area into an insulated area, for interrupting the contact established as suggested, the movable contact, during a pushing movement, is simultaneously lifted and thereby abruptly separated from the planar, stationary contact. A special advantage also resides in that, by simply replacing the foil, different contact sequences up to stationary contacts can be achieved that are fully covered by the foil and thus no longer contacted. Hence, by replacing or adjusting the foil-type, the switching functions of an otherwise unchanged switch can be easily adapted to different requirements.

In practice, the planar printed conductor contacts forming stationary contacts in the switch have proved satisfactory. However, in cases where a particularly high load of the stationary contacts and an above-average wear resistance are required, it is recommended that the stationary contacts are formed by contact plates applied to the conductor foil, with claws projecting from the contact plate penetratingly seizing the foil and being caulked therewith, i.e., the contacts possibly applied to the conducting areas of the conductor foil are crimped or riveted thereon. This way of contact-making is especially suitable for movable contacts involving lift movement, wherein the movable contacts are moved in a direction perpendicular to the conductor foil. If an individual contact between the stationary contacts and the associated printed conductor is to be prevented, it is suggested that the contact plates are formed by an integral contact spider which is separated after fixation of the contact. The simultaneous introduction of several integrally interconnected stationary contacts into the switch, for example, by casting, is known per se. This embodiment of the invention is particularly advantageous because a plurality of connecting lines can be connected to the associated stationary contacts in a single run.

Irrespective of whether the printed conductors themselves act exclusively as stationary contacts or are reinforced by additional contact material, connector contacts can be crimped to the connector faces on the connecting end of the flexible conductor foil. According thereto, in a manner comparable with the contact plates, contacts are applied to the individual ends of the lines preferably extending in parallel with respect to one another; however, they no longer serve as stationary contacts nor are they rigidly connected to the casing but, preferably, carry connecting pins with connectors plugged thereon. Other connecting techniques are, of course, possible, such as the accommodation of the connector ends in cut/plug connectors, or soldering the pin ends to printed circuit board contacts in the solder bath or the like.

An especially advantageous design for the connection of terminals within the switch casing to the associated stationary contacts is attained if the stationary contact faces on the contact section are connected, through parallel printed conductors, to the connecting faces. The connecting section carrying the printed conductors preferably is smaller than the contact section and the connector section. The individual stationary contacts can be—as previously set forth—of a planar configuration so that, in the direction extending transverse to the longitudinal direction of the conductor connections, they are larger dimensioned than the narrow line connections extending in parallel with respect to one another.

It has already previously been explained that the section of the foil carrying the stationary contacts can be secured by openings provided in the foil into which projections protrude from the switch casing. Comparable measures-which include that the connecting section is provided with centering openings into which centering projections of the switch protrude-can also be recommended for the connector section in which the narrow printed conductors are guided in parallel with respect to one another across an extended distance.

The invention is particularly advantageous for use with a switch provided with a switch lever, with the switch contacts being disposed in the free end area of the switch lever and with connecting lines of great length between the connecting area and the stationary contacts. This applies, for example, to switches used with steering column assemblies. Generally, the connecting technique presently described can also be employed with other fields of application wherein a connecting line of great length is to be guided from a switch casing to another more remote point of connection. In particular, it is advisable in respect of switches used with a steering column assembly, to guide the connector of the printed conductors in the longitudinal direction of the switch lever because an especially short connection is obtained thereby.

A special advantage of the invention resides in that the printed conductors, on the one hand, are held flexible and, on the other hand, are held in spaced relationship from one another through the foil. This means that the complete connecting conduit, on the one hand, is extremely flat and on the other had is easily bendable. Moreover, the cross-section of the total of all printed conductors inclusive of the insulator, is very small, resulting in that the printed conductors can be laid not only within the lever of a switch used with a steering column assembly but also in the outer area thereof, for example, by guiding the printed conductor in curved way about the surface of the switch lever. The only disadvantage involved therewith resides in that, depending on the arrangement of the switch lever, the printed conductor is externally visible. In that case, it is advisable that the switch lever—viewed in the longitudinal direction—is composed of at least two lever parts extending approximately across the length of the connecting line. As these two lever parts have one limiting face in common, the flexible printed conductor can be hidden in the area of the limiting face, thereby providing a variety of advantageous options. On the one hand, the switch lever can be formed of two substantially concentric parts, with the conductor foil being secured to the surface of the inner part and the second part being then pushed across the first part in the form of a diaphragm. Also, the switch lever can be provided with a slot extending in the longitudinal direction thereof in which the printed conductor can be easily laid in view of its small cross-section. The slot extending in the longitudinal direction of the switch lever can be so closed, for example, by a locking means, that the stiffness required for the switch operations is retained by the switch lever. Also, the printed conductor could be laid about at least one sector of the switch lever which is expected not to allow the ingress of mechanically disturbing forces.

Another preferred form of embodiment results from a switch lever which is divided into two lever parts extending in the longitudinal direction thereof, that can be united by a radial movement relative to one another. The lever portions can be formed by an upper shell and a lower shell locked therewith, with the size of the upper shell preferably exceeding the size of the lower shell. Basically, this form of embodiment resides in that the lower shell is locked on the upper shell forming the actual lever, with the lower shell serving as a diaphragm and, if need be, as a receiving unit for the printed conductor.

Furthermore, the lower shell is provided with one or more resilient projections accommodating the conductor foil, wherein the lower shell is locked with the upper shell, with the lower shell, and especially the locking projections thereof serving as an accommodating unit for the flexible conductor foil wherein the conductor foil is oriented in parallel to the plane of symmetry of the shells of the lever and, when passing over to the connector section and/or the contact section, preferably, is turned by about 90 degrees about the longitudinal axis of the conductor foil.

There are several advantageous options for the position of the conductor foil. On the one hand, the foil can be guided in the plane of symmetry of the two shells and, hence, in a direction substantially vertical to the surface thereof. Consequently, the printed conductor is located approximately in the direction of the cross-sectional plane clamped by the locking means. In this respect, it is especially advantageous that the locking means can be of relatively small dimensions. However, it is less advantageous that at least one longitudinal groove of a depth sufficient to accommodate the flexible printed conductor throughout the width thereof must be provided in one of the shells.

For aesthetical reasons it would be advisable to rotate the groove over the contact plane of the stationary contacts by 90 degrees.

An advantageous procedure includes that the foil of the printed conductor is laid substantially in parallel to the surface of the bottom shell, it being, however, possible for the curvature of the printed conductor to be substantially larger than the surface curvature of the bottom shell. Due to this measure, the need for a rotation of the printed conductor by about 90 degrees in the longitudinal plane thereof is eliminated, thereby saving the printed conductor and facilitating laying thereof. The described combination of features also establishes the prerequisite for a further advantageous design of the switch lever. As the line connection now is no longer laid through the interior of the lever itself but in the external area thereof it can be designed as a cavity closed in-itself. Hence, it is no longer necessary to provide openings in the switch lever enabling the lines to be guided through the interior thereof, thereby permitting that at least the upper shell is a hollow body of plastic material which is closed in itself, and thus substantially contributing to the stability of the switch lever. However, as the switch lever can be designed as a compact body closed in itself, the upper shell can be manufactured in an extrusion process operating on an internal gas pressure within the body for casting the body, thereby not only reducing the weight of the switch lever and increasing its strength but also improving the surface quality thereof.

BRIEF DESCRIPTION OF THE DRAWINGS

FIG. 1 is a plan view of the flexible conductor foil according to the invention;

FIG. 2 shows a mounting board serving as a support for the stationary contact area of the foil according to FIG. 1;

FIG. 3 is a side view of the board according to claim 2;

FIG. 5 shows the possible folding of the symbolically shown conductor foil about its longitudinal axis by about 90°;

FIG. 8 shows the opened end area of the lever for a switch used with a steering column assembly;

DETAILED DESCRIPTION OF THE DRAWINGS

Figure 4:
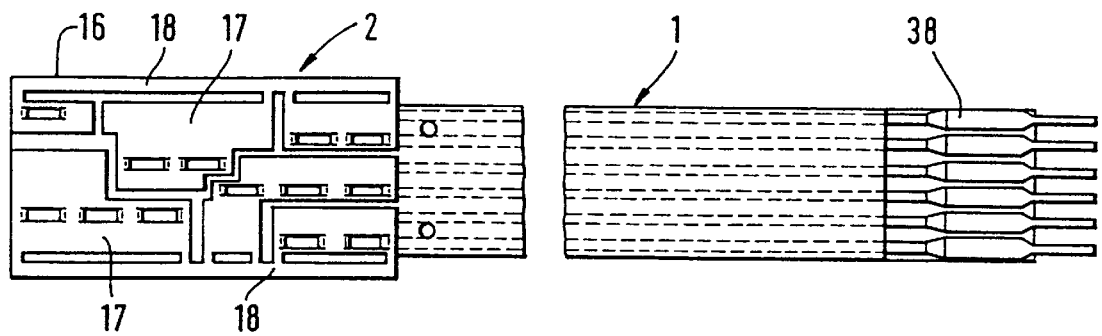
FIG. 4 shows a cut of the foil according to FIG. 1 with a contact spider mounted for the stationary contacts and crimped-on connectors.
Figure 6:
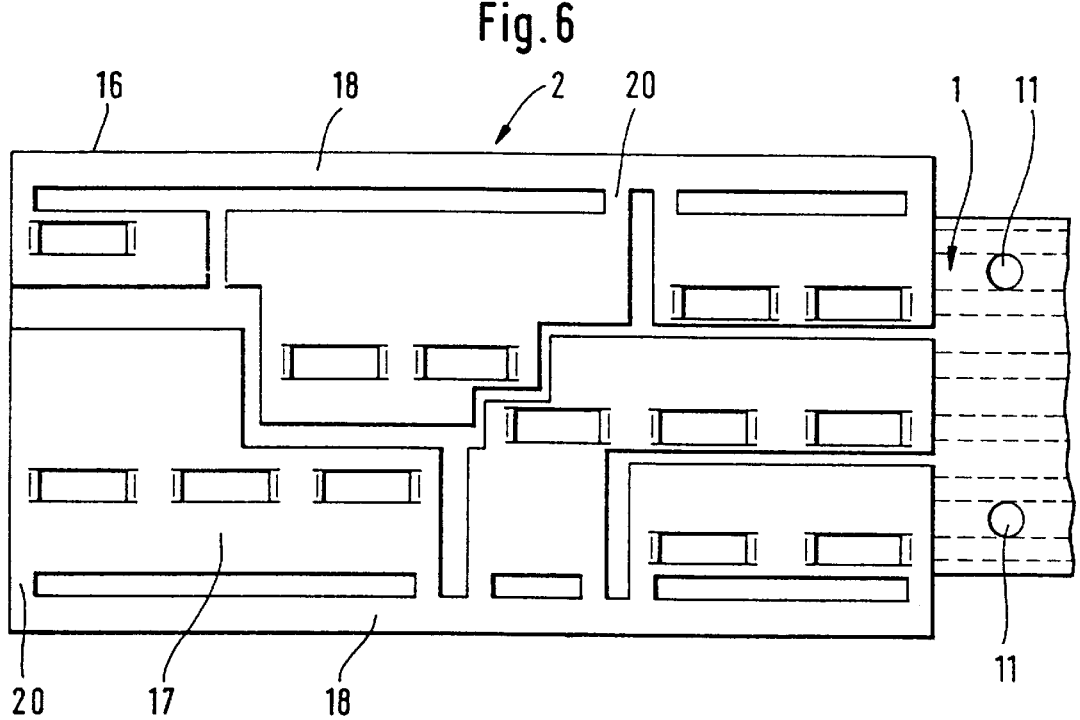
FIG. 6 shows the contact spider in enlarged scale with stationary conductor foil contacts according to FIG. 4.

Now, referring to the drawings, FIG. 1 shows a conductor foil 1 that can be divided into a contact section 2, a coupling or connecting section 3 and a connector section 4.

The contact section 2 carries the stationary contacts of a switch, while the narrow printed conductors in parallel with respect to one another establish a connection between the contact section 2 and the connector section 4. As explained hereinafter, the connector section 4 itself carries connector contacts 38. The printed conductors 5 pass over into contact faces 6 on the contact section. The same applies, mutatis mutandis, to the connecting faces 7 in the connector section 4.

The flexible conductor foil 1 is conventionally designed, with the manufacturing process not forming part of the subject matter of the present invention. Basically, conventional manufacturing processes are employed known in the pertinent art.

Both the connecting section 3 and the connector section 4 are provided with an insulating layer facing the viewer, while the contact section 2 is not so covered, thus exposing the conducting contact faces. As the thickness of foil 1 is very low it can be easily curved and bent.

Both the contact section and the connecting section are provided with openings 8 through 11 centering and locking the foil 1 vis-à-vis the stationary components of the casing. In part, the openings, e.g. openings 9 and 10, also insure the passage of components, such as locking snap contours, pre-clamped lock pins and the like. The openings 11 in the connecting section 3 must not be excessively large in order not to unduly weaken the printed conductors 5.

The stationary contacts are directly formed by the planar contact faces on the contact section, of the conductor foil, with the planar contact faces being integrated into the flexible conductor foil and integrally connected thereto. The contact faces 6 serve for direct contact-making, acting as stationary contacts for a switch so that the through-connection of circuits occurs in that a movable contact (not shown) gets into electrical contact with, the associated contact face 6, with the movable contacts, in a pushing movement, being movable in parallel to the view plane of FIG. 1, but also in a lifting or rotating movement in a direction perpendicular thereto.

Surprisingly enough, the comparatively thin contact material of the contact faces has proved to be rather resistant so that it is well suitable for direct contact-making as a stationary contact.

FIG. 2 is a plan view of a board stationarily mounted in the actuating lever of a steering column switch, which board is arranged below the contact section 2 of the conductor foil 1 in order to prevent a curving of the contact faces concerned vis-à-vis an abutting movable contact, thus forming a suitable abutment. The board 13 is made of an insulating material, such as plastics, and is provided with openings corresponding to the openings 8 through 10, intended for the passage of components. The fixation of the stationary contacts vis-à-vis the board can be improved by cementing the contact section 2 onto the board.

FIG. 3 is a side view of the board according to FIG. 2, with the strength of board 13 being so selected that it is of an adequate stiffness over the force of the abutting movable contacts.

FIG. 5 shows a possible course of movement of the flexible conductor foil according to FIG. 1, demonstrating that the foil 1 can be relatively long, with a center section of the foil being not shown in the drawings of FIGS. 1 and 4. Moreover, FIG. 5, shows that foil 1 can be folded up thus being easy to manufacture or commercially obtainable as an elongated conductor, and, due to foldings 14,15, also being capable of being laid in curves or meanders.

Figure 7:
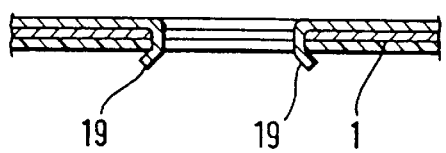
FIG. 7 is a sectional view of a cut showing the crimping of the contact spider according to FIG. 6.

FIG. 4 shows a so-called contact spider 16 mounted on the contact section 2 as shown in FIG. 1. The contact spider 16 includes, in a known per se way, insular contact plates or areas 17 integrally interconnected by connecting strips 18. The contact areas 17 correspond to associated contact faces 6 on the conductor foil 1. For connecting the individual contact areas 17 of the contact spider 16 made of an integral plate, to the contact faces 6, they are crimped, as shown in FIG. 7, onto the associated contact faces, with spikes or claws 19 punched out of the spider 16 penetrating through the associated contact faces inclusive of the conductor foil 1 and being bent by caulking (see FIG. 7). After mounting the contact spider 16, true to position, on the contact section 2, the connecting strips 18 are severed by separating the webs 20, thereby electrically separating the individual insular contact areas 17.

According to FIG. 4, the connector section 4 of FIG. 1 is provided with crimped connector contacts 38, with the spikes or claws (not shown) of the connector contacts 38 corresponding to the spikes or claws 19 of FIG. 7 punching through the insulating layers on the upper and lower surfaces of the conductor foil 1, thereby cutting through the copper printed conductors and getting into contact with the printed conductors 5. The insulating webs 36, in the area of the connector section are of greater width than in the connecting section 3 so that in this area the width of the flexible conductor foil 1 increases. Also, the contact section 2 has a greater width than the connecting section 3 because the contact faces are of a substantially greater width than the printed conductors 5 and the connectors of the contact faces shown far to the left in FIG. 1 are to be guided around the contact faces 6 located farther to the right.

Figure 10:
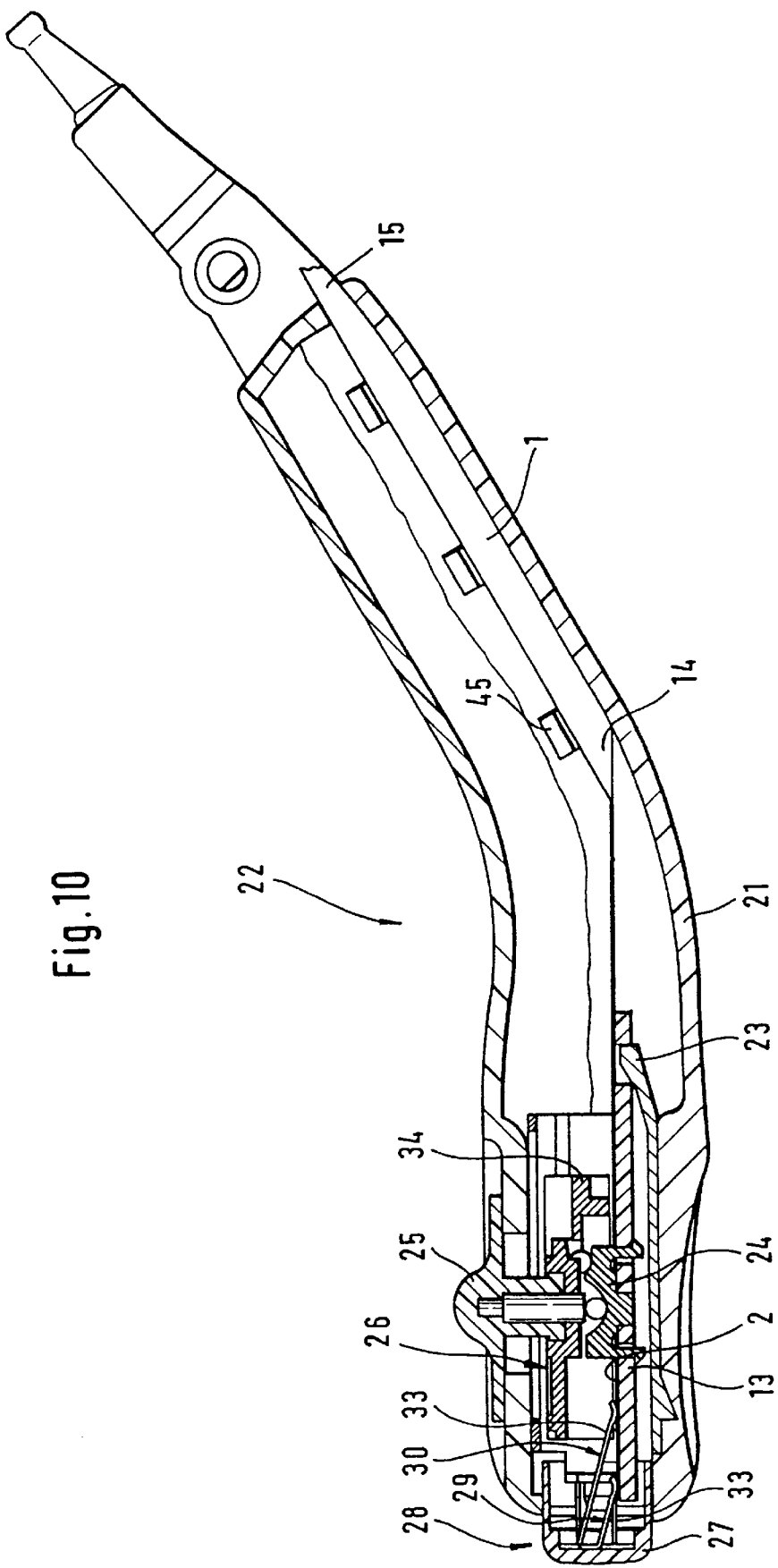
FIG. 10 shows the switch lever according to FIG. 9 provided with a switch in operating position.

FIGS. 8 and 10 show a switch construction for a switch provided in the handle of a steering column switch, in which the invention can be suitably used. FIG. 8 shows a lower shell 21 of a switch lever 22 consisting of two shells extending longitudinally of the lever. Provided in the lower shell is a support 23 for the board to support the end of the board 13 protruding into the interior of the switch lever 22 and to lock the board vis-à-vis potential displacements. As previously explained in connection with FIGS. 1 through 3, the contact section 2 of the conductor foil 1 is located on the board. A locking contour 24 is locked onto the board 13 in a way penetrating the conductor foil 1 to fix the locking position for the slide of a slide switch 26. Contact springs 29,30,31,32 having one or more arms are secured both to the slide 25 of the slide switch and to an axially movable pressure button 27 of a pressure switch 28.

The individual arms 33 of the afore-mentioned contact springs, with the ends thereof, are facing the contact section 2 of the conductor foil. Hence, the arms 33 form the movable contacts of the two afore-mentioned switches that can get into electrical contact with the stationary contacts on the contact section 2. FIG. 8 shows the contour of a follower 34 of the slide switch 26 which, due to its being displaced in parallel to the contact section 2, also displaces in parallel the contact springs 31,33 connected thereto.

The contact section 2 is covered by an insulating foil 35 releasing the contact section 2 with the contact faces 6 thereof only at special points through its cuts 37, thereby insuring that the spring arms 33 are in abutment with the associated contact, faces 6 only in very specific positions of the contact springs 29 through 32. It is particularly advantageous that by simply replacing a foil, the order sequence of the contact-making, or the contact making as such, can be stipulated or changed with only requires that the new foil be provided with suitable cuts 37. A special advantage involved with the foil also resides in that the ends of the spring arms 33, via the edges of the cuts 37, are abruptly lifted and separated from the contact faces 6 once the ends pass the edges of the cuts 37. In this way the contacts are rapidly interrupted, thereby largely preventing the formation of arcs and, hence, a contamination and corrosion of the contacts.

FIG. 10 additionally shows foldings 14,15 of the flexible conductor foil 1.

Figure 12:
FIG. 12 is a sectional view of the switch in an area in the vicinity of the connectors.
Figure 11:
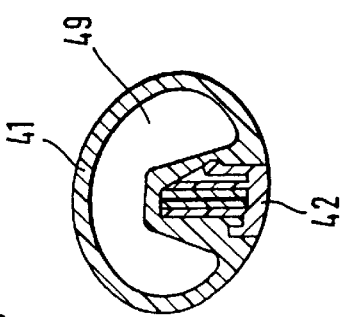
FIG. 11 is a cross-sectional view of the switch in an area in the vicinity of the switch according to FIG. 10.
Figure 9:
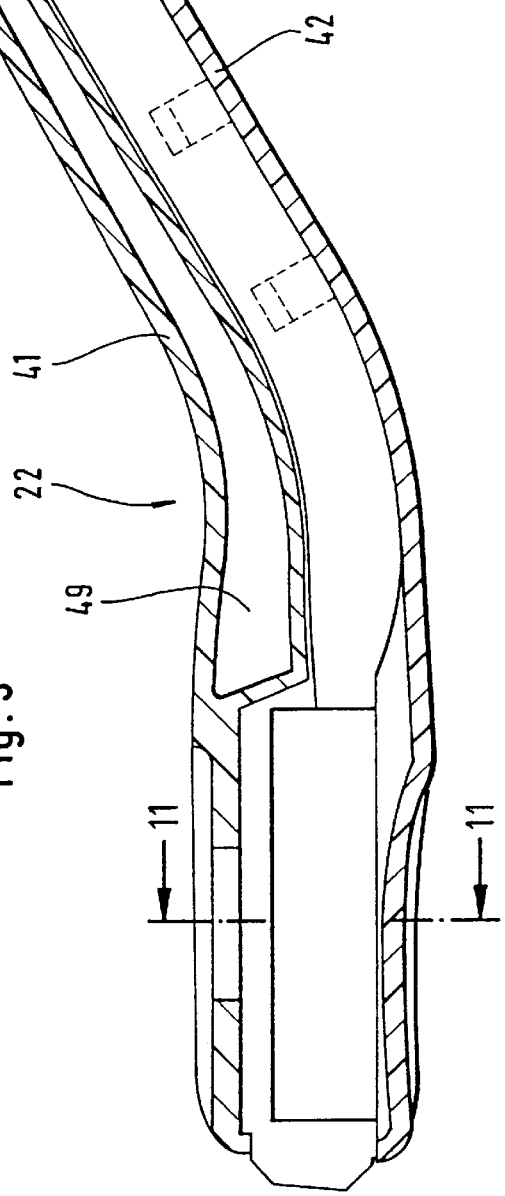
FIG. 9 is a sectional view of a switch lever made up of two shells for use with a steering column assembly.
Figure 13:
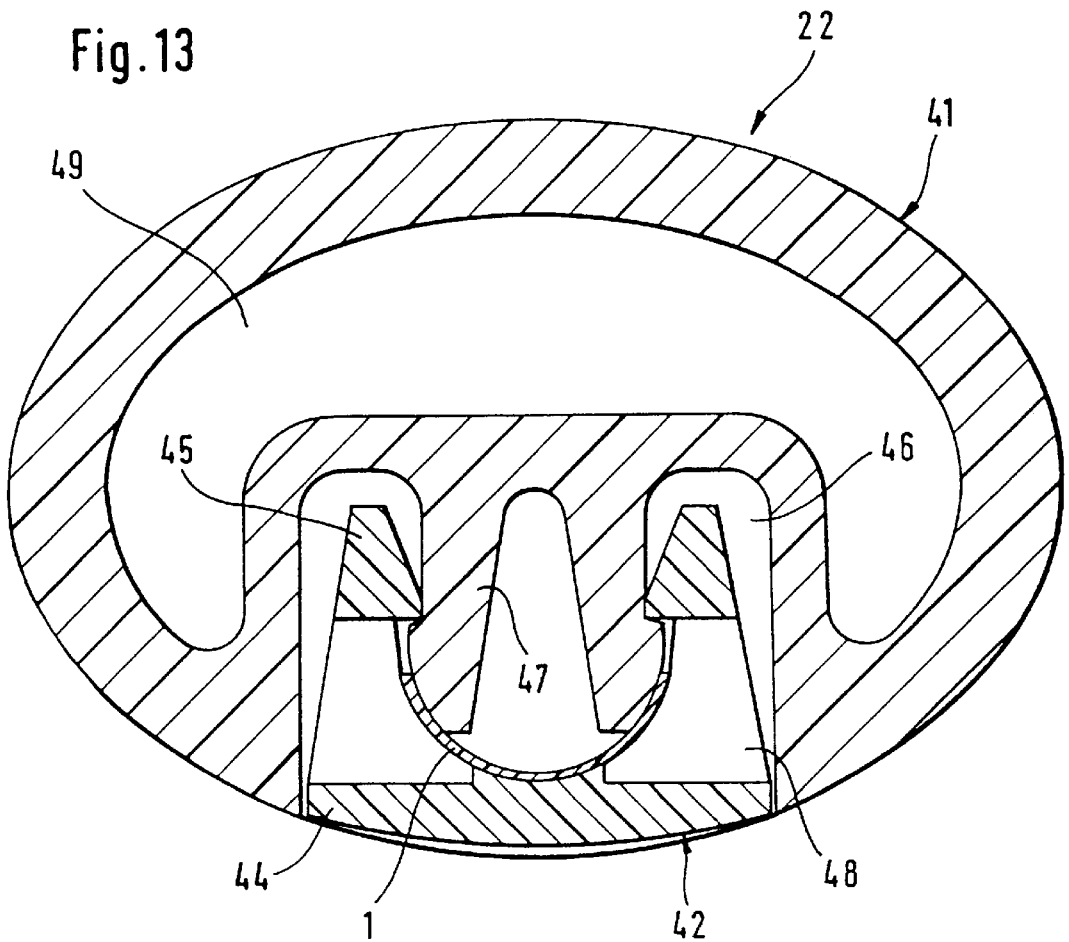
FIG. 13 shows the laying of the conductor foil in the limiting plane between the lower and upper shells.
Figure 14:
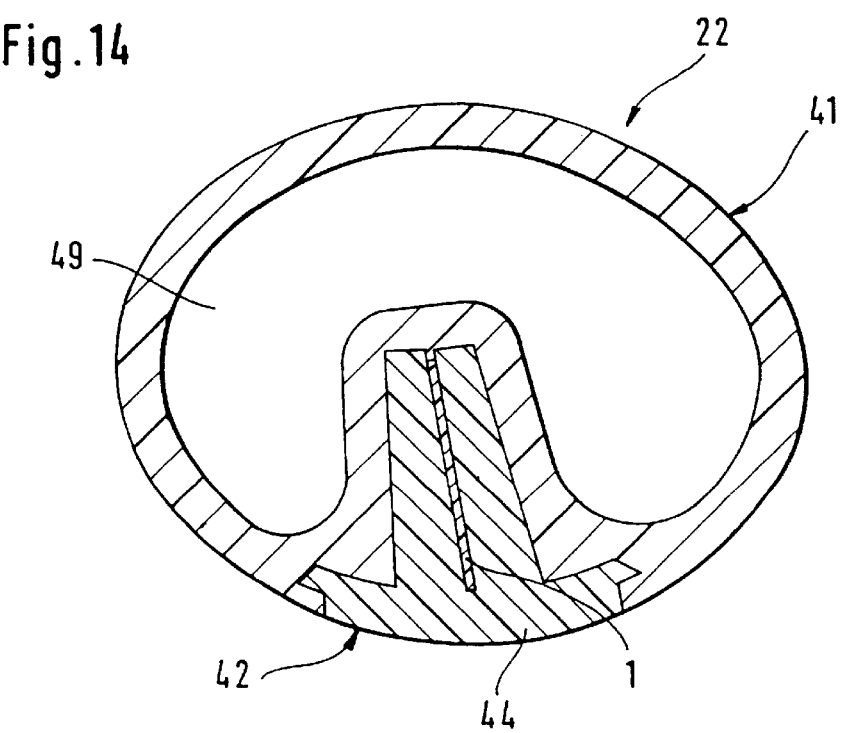
FIG. 14 shows the laying of the foil in the lower shell.

As previously described, laying in the connecting conduit can be substantially simplified over the prior art process by using, in accordance with the suggestion of the invention, a flexible conductor foil acting as a connection between the contact section and the connector section. To that extent—as especially shown in FIG. 9 and clearly demonstrated in FIGS. 13 and 14—the switch lever 22 formed of two shells, i.e. an upper shell 41 and a lower shell 42. The lower shell can be relatively small dimensioned, substantially serving as a diaphragm for covering the accommodating unit for the conductor foil 1 in the upper shell 41. Also, it could be slightly larger dimensioned to accommodate the conductor foil itself. Corresponding suggestions are shown in FIGS. 13 and 14 respectively illustrating a cross-section at a, suitable point through the switch lever 22. According thereto, the lower shell 42 substantially consists of a base body 44 substantially serving as a diaphragm along the switch lever. Locking projections 45 emerge from the base body 44 protruding into corresponding recesses 46 in the upper shell 41 and locked therein by the resilient locking member 47. FIGS. 11 and 12 show additional options to interlock the locking projections or locking members of the shells in a comb-type manner to achieve an even greater stability of the locking connection. According to FIG. 14, the lower shell 42 is provided with a slot for accommodating the conductor foil 1. As the conductor foil is vertically oriented to the base body 44, this way of laying the conductor foil will require the foldings 14 and 15, respectively, described hereinabove, in order to re-orient the conductor foil at the level of the contact section 2 substantially in parallel to the base body 44. Another highly desirable and space-saving way of laying is shown in FIG. 13 according to which the conductor foil 1 is laid in curved form along the inner contour of the locking projections 45, with the locking projections being provided with recesses 48 for improving the spring action.

As especially shown in FIGS. 9,12,13 and 14, the upper shell 41, in part, can be designed as a hollow body closed in itself, thus comprising an interior chamber 49 closed in itself. The upper shell is cast or extruded according to one of the conventional processes working on internal gas pressure. The interior chamber 49 can be loaded with gas under pressure. The essential advantage involved is that, on the one hand, the walls of the upper shell can be kept relatively thin, with the upper shell nevertheless retaining the strength required for operating the switch lever 22. On the other hand, the switch lever 22 is thus of a relatively low-weight and material-saving design. In addition, the surface of the upper shell is of a very high quality.

FIG. 14, in addition, conveys that the lower shell 42 can engage a recess of the upper shell 41 in that lateral locking vanes provided in the lower shell 42 engage corresponding openings in the upper shell. FIG. 11 is a sectional view of the switch lever 22 approximately at the level of the section line A-B in FIG. 9.

We claim:

1. A switch with connector contacts which are connected to stationary contacts through flexible conductors, the switch switching circuits in connection with moveable contacts, the flexible conductors formed by a flexible conductor foil, the flexible conductor foil including a contact section which carries the stationary contacts and is fixed to a board stationarily arranged on the switch, the stationary contacts directly formed by planar contact faces on the contact section of the conductor foil, with the planar contact faces integrated into the flexible conductor foil and integrally connected thereto, wherein the stationary contacts are associated to moveable contacts which are displaceable in parallel to the surface of the stationary contacts, and wherein the contact faces of the stationary contacts are formed by recesses of an insulator foil placed on the contact section.

2. A switch according to claim 1, wherein the stationary contacts are formed by printed conductors of the flexible conductor foil.

3. A switch according to claim 1, wherein, for centering the contact section on the board, at least one projection protrudes from the board into a corresponding opening provided in the contact section.

4. A switch according to claim 1, wherein the contact section is cemented onto the board.

5. A switch according to claim 1, wherein the conductor foil has a connector section including connector faces to which the connector contacts are crimped.

6. A switch according to claim 5, wherein a connecting section is disposed between the contact section and the connector section and is provided with centering openings into which centering projections of the switch protrude.

7. A switch according to claim 1, wherein the conductor foil includes a connector section, and the stationary contact faces on the contact section are connected, through parallel printed conductors, to connector faces, with the connector section carrying the printed conductors, being smaller than the contact section and the connector section.

8. A switch with connector contacts which are connected to stationary contacts through flexible conductors, the switch switching circuits in connection with moveable contacts, the flexible conductors formed by a flexible conductor foil wherein the stationary contacts are formed by contact plates applied to the conductor foil, with claws projecting from each contact plate penetratingly seizing the foil and being caulked therewith.

9. A switch according to claim 8, wherein the contact plates are formed by an integral contact spider which is separated after fixation.

10. A switch with connector contacts which are connected to stationary contacts through flexible conductors, the switch switching circuits in connection with moveable contacts, the flexible conductors formed by a flexible conductor foil wherein the switch forms a steering column switch provided with a switch lever, with contacts being disposed in a free end area of the switch lever.

11. A switch according to claim 10, wherein the connector section is guided between the connector faces and the stationary faces along the switch lever.

12. A switch according to claim 10, wherein the switch lever is formed at least of two interconnected lever portions extending along the lever, with the conductor foil being arranged adjacent the interconnection of the two lever portions.

13. A switch according to claim 12, wherein the lever portions are formed by an upper shell and a lower shell locked with the former, with the size of the upper shell exceeding the size of the lower shell.

14. A switch according to claim 13, wherein the lower shell is provided with at least one resilient projection accommodating the conductor foil.

15. A switch according to claim 13, wherein the upper and lower shells have a plane of symmetry, and the conductor foil has a longitudinal axis, which plane and which axis are, at least in part, oriented in parallel to each other.

16. A switch according to claim 13, wherein the upper and lower shells have a plane of symmetry and the conductor foil is guided in a direction perpendicular to the plane of symmetry between the upper and lower shells.

17. A switch according to claim 13, wherein at least the upper shell is a hollow body of plastic material which is closed in itself.

18. A switch according to claim 17, wherein the upper shell is manufactured according to an extrusion process operating on an internal gas pressure within the body.

19. A switch according to claim 10, wherein the stationary contacts are formed by printed conductors of the flexible conductor foil.

20. A switch according to claim 10, wherein the flexible conductor foil includes a contact section which carries the stationary contacts and is fixed to a board stationarily arranged on the switch.

21. A switch according to claim 20, wherein, for centering the contact section on the board, at least one projection protrudes from the board into a corresponding opening provided in the contact section.

22. A switch according to claim 20, wherein the contact section is cemented onto the board.

23. A switch according to claim 20, wherein the conductor foil includes a connector section, and the stationary contact faces on the contact section are connected, through parallel printed conductors, to connector faces, with the connector section carrying the printed conductors, being smaller than the contact section and the connector section.

24. A switch according to claim 20, wherein the stationary contacts are directly formed by planar contact faces on the contact section of the conductor foil, with the planar contact faces being integrated into the flexible conductor foil and integrally connected thereto.

25. A switch according to claim 24, wherein the stationary contacts are associated to moveable contacts which are displaceable in parallel to the surface of the stationary contacts, and wherein the contact faces of the stationary contacts are formed by recesses of an insulator foil placed on the contact section.

* * * * *